Oct. 16, 1928.
C. L. PERRY
1,687,508
CONTROLLER
Filed Feb. 18, 1926
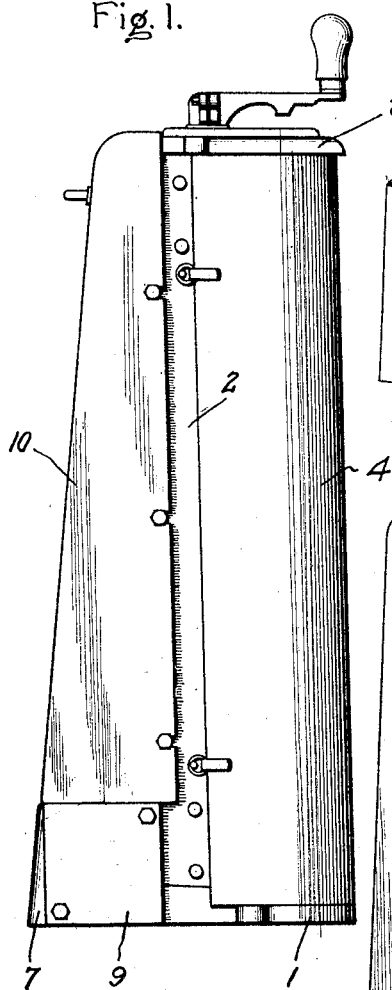
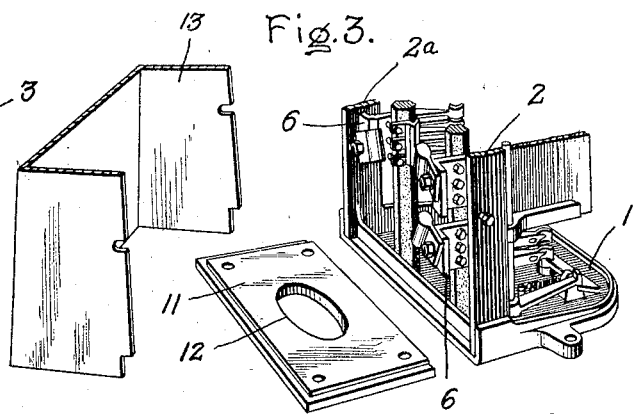
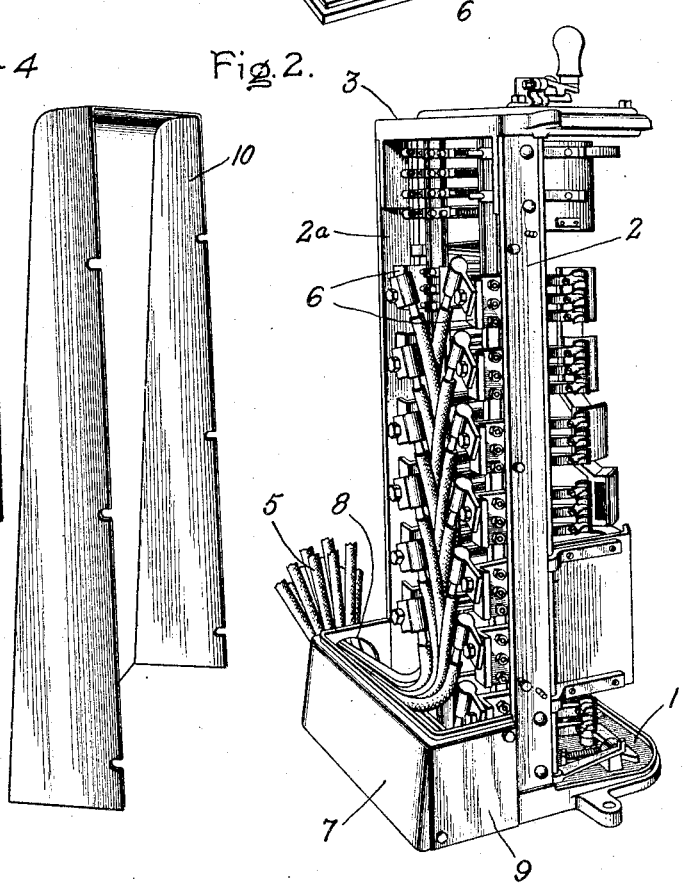
Inventor:
Charles L. Perry,
by Alexander S. Lunt
His Attorney.

Patented Oct. 16, 1928.

1,687,508

UNITED STATES PATENT OFFICE.

CHARLES L. PERRY, OF SCHENECTADY, NEW YORK, ASSIGNOR TO GENERAL ELECTRIC COMPANY, A CORPORATION OF NEW YORK.

CONTROLLER.

Application filed February 18, 1926. Serial No. 89,248.

My invention relates to controllers enclosed in casings, such as are in common use upon cranes, hoists, etc. The object of my invention is to provide a casing construction which will facilitate the bringing of the various cables into the controller and the attachment thereof to their proper terminals when installing the controller in its place of use.

In all prior constructions of which I am aware, the ends of the cables have been drawn through an opening or openings in one of the main portions of the controller casing, such as the bottom plate, back plate or a side wall, and thereafter attached to their respective terminals in the body of the controller. The drawing in of the cables and the attachment of their ends have often been inconvenient, tedious or difficult operations, as the casing and the contained parts of the controller itself prevented ready access to the cables and to the parts to which they must be attached.

To overcome the difficulty in drawing in the ends of the cables, I provide a separate box or plate with an opening or openings therein which forms a portion of the casing when the installation has been completed. This box or plate may be put in place, and the ends of the cables are drawn through the opening or openings therein, in advance of the placing in position of the body of the controller and the remaining portions of the casing. To overcome the difficulty in the attachment of the ends of the cables, I provide a separate back plate which need not be applied to the controller until after the cables have been attached to their respective terminals. When both of these features are used, the ends of the cables are threaded through a small portion of the wall of the casing before the body of the controller and the remainder of the casing are placed in the workman's way, and the ends of the cables and the terminals of the controller to which the cables must be attached are still readily accessible after the body of the controller has been put in place.

Referring to the accompanying drawing in which the preferred forms of my invention are illustrated: Fig. 1 shows a controller with an inlet box and a removable back, all in assembled position; Fig. 2 shows the same controller with the back separated therefrom and the cover or front removed; and Fig. 3 shows the lower portion of a controller and casing in which a plate is used instead of a box.

In the various figures, 1 represents the bottom plate of a controller casing 2 and $2^a$ represent the side bars, and 3 the top plate. These parts constitute a frame which carries the various fixed and movable devices which constitute the operative elements of the controller. The usual cover plate 4 forms the front wall of the casing. The cables 5 leading into the controller are attached to the controller terminals 6.

In the form of my invention shown in Figs. 1 and 2, the lower rear portion of the casing consists of a box 7 which has a bottom and three sides. An opening 8 is shown in one side of the box 7 for the entrance of the cables 5. The cover 9 is provided to cover a similar opening in the opposite side of the box. The back 10 is adapted to rest upon the upper edge of the box 7 and to be fastened to the side bars 2 and $2^a$. The back 10, box 7, side bars 2 and $2^a$, front or cover 4, top 3, and bottom 1, when assembled, form a complete casing, as shown in Fig. 1.

In the form of my invention shown in Fig. 3, a plate 11 is used instead of the box 7 of Figs. 1 and 2. This plate is provided with an opening 12 for the entrance of the cables. When the parts are in assembled position, the rear of the bottom 1 is seated against one edge of the plate 11 and the back 13 rests upon or seats against the three remaining edges of this plate.

When the controller is to be installed upon the platform of a car or in any other position where such a device is used, the box 7 or plate 11 is first put in place. The ends of the various cables 5 are then drawn through one or more of the openings therein. The controller frame comprising the side bars 2 and $2^a$, top 3 and bottom 1 and the operative elements of the controller which are attached thereto are next brought into registry with the box 7 or plate 11 and fastened in place. The ends of the various cables 5 are thereafter attached to their respective terminals 6. The back 10 or 13 and cover 4 are thereupon applied and fastened in place.

It will be observed that the threading of the ends of the cables 5 through the opening or openings in the box 7 or plate 11 may be entirely accomplished before any other portion of the controller or its casing is put in place. It is also seen that the body of the controller may then be placed in position and that the ends of the cables 5 may then be associated each with its proper terminals 6 and fastened while the parts are fully exposed for this purpose and that this freedom of access is rendered possible by the separation of the back plate from the portion of the casing through which the cables are brought in, and from the controller and the other portions of the casing.

What I claim as new and desire to secure by Letters Patent of the United States is:

1. A controller comprising operable controller elements including terminals for the attachment of the ends of cables leading from outside of the controller, said terminals being located at the back of the controller, a frame in which said elements are mounted which comprises a base plate, a top plate and side bars, a separately installable member, located at the back and bottom of the controller adjacent the base and side bars thereof and having an opening for the passage of said cables, a cover cooperating with the top plate, base plate and side bars to form a casing for the front of the controller, a separately applicable back cooperating with the top plate, side bars and separately installable member to form a casing for the back of said controller over said terminals.

2. A controller comprising operative controller elements including terminals for the attachment of the ends of cables leading from outside of the controller, said terminals being located at the back of the controller, a frame in which said elements are mounted which comprises a base plate, a top plate and side bars, a separately installable box having a bottom wall and a side wall, said box located at the back and bottom of the controller adjacent the base and side bars thereof and having an opening or openings in its walls for the passage of said cables, a cover cooperating with the top plate, base plate and side bars to form a casing for the front of the controller, a separately applicable back plate cooperating with the top plate, side bars and box to form a casing for the back of said controller over said terminals.

In witness whereof, I have hereunto set my hand this 17th day of February, 1926.

CHARLES L. PERRY.